United States Patent Office 2,746,911
Patented May 22, 1956

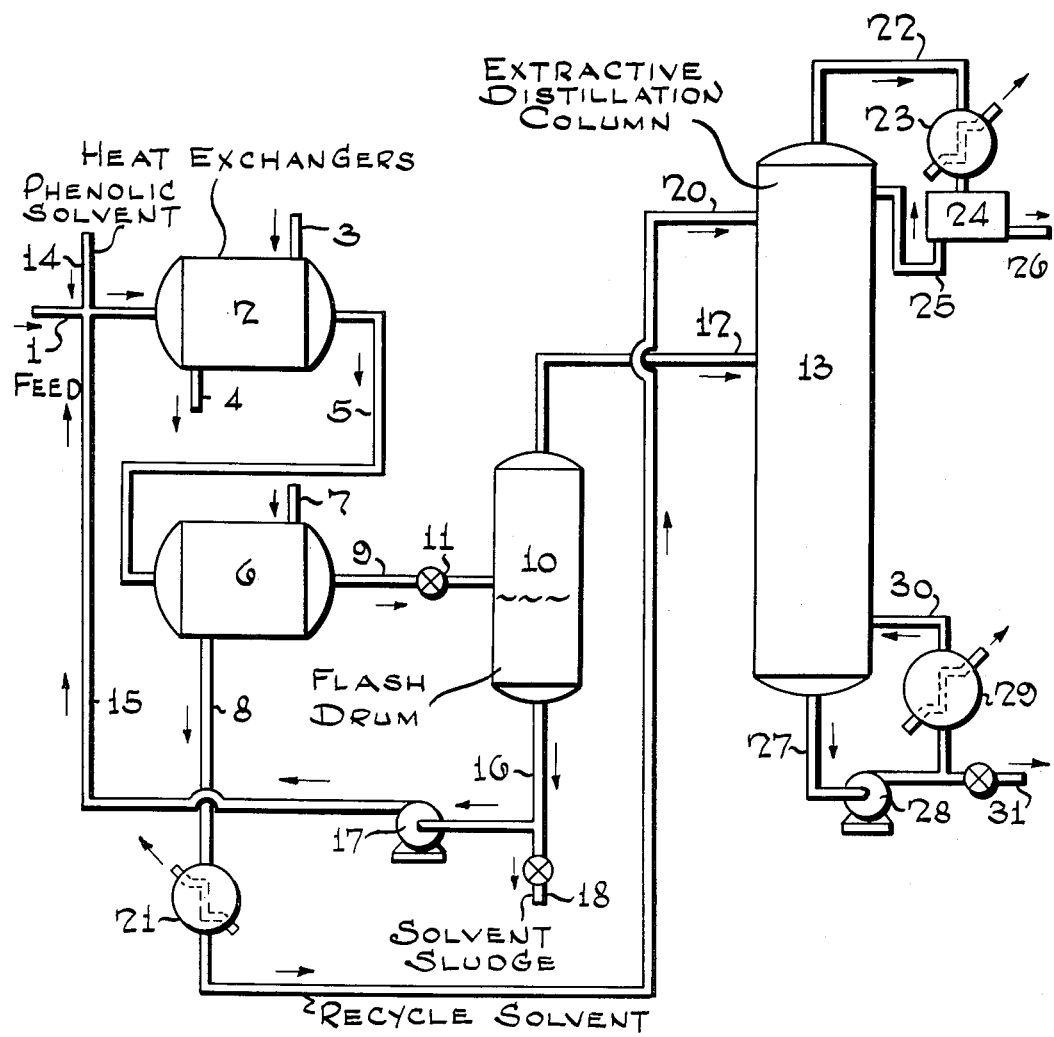

2,746,911

EXTRACTIVE DISTILLATION SLUDGE CONTROL PROCESS

Daniel S. Maisel, Union, N. J., assignor to Esso Research and Engineering Company, a corporation of Delaware Application October 22, 1952, Serial No. 316,255

5 Claims. (Cl. 202—39.5)

This invention relates to a method of sludge control which uses a minor portion of phenolic solvent in a feed vaporizing section of an extractive distillation unit in which unsaturated hydrocarbons are separated from aromatic hydrocarbons with a larger portion of the phenolic solvent.

By injecting only about 1 to 5 weight per cent of the total solvent employed for the extractive distillation into said vaporization heating tubes, then flash vaporizing the hydrocarbons in a drum where sludge and polymers are separated, the formation and separation of such high-boiling materials is controlled. The controlled formation of these high-boiling materials prevents their deposition in parts of the apparatus where such deposition would be very detrimental.

During extracting distillation processes, such as are used for the recovery of a $C_6$ to $C_8$ aromatic hydrocarbon, e. g., benzene, toluene and xylenes, certain $C_5$ to $C_8$ olefinic and diolefinic hydrocarbons cause formation of several high-boiling substances, including polymers and alkylated solvent. The formation of these high-boiling materials tends to be favored by high temperatures, certain concentrations of the reactant material, the presence of metallic surfaces, and residence periods under conditions favorable to the polymerizing and alkylating reactions of the $C_5$ to $C_8$ unsaturated hydrocarbons.

It has been found that deposition of solid material occurred during feed vaporization. During feed vaporization, the reactive hydrocarbons become concentrated in residual liquid fractions while high-boiling polymers are deposited on heating tube walls, where they tend to polymerize and dehydrogenate further into solid material which clogs the tubes. Also it has been observed that high-boiling materials and solids formed most readily on contact of the preheated feed with hot phenolic solvent in an extractive distillation column, particularly when the feed was largely vaporized. The deposition of solid polymer in the extractive distillation column disrupts the extractive distillation process.

Further advantages of the process will be discussed after explaining the method of operation in more detail with reference to the accompanying drawing.

The drawing illustrates schematically a flow plan of the vaporization section preceding an extractive distillation column.

In the drawing, the crude aromatic and olefinic hydrocarbon feed is passed in a continuous stream by line 1 to heat exchange tubes in heat exchanger 2. Steam, or other fluid heating medium, is passed through the heat exchanger 2 from inlet line 3 to outlet line 4 for indirect heat exchange with the material flowing through the heat exchange tubes. The thus heated hydrocarbon material is passed by line 5 into heat exchange tubes of a second heat exchanger 6 and around the heat exchange tubes is circulated a fluid heating medium entering heat exchanger 6 by line 7 and leaving by line 8. Thus, one or more heat exchangers may be used. The heating medium used in the first heat exchanger 2, may be either steam or hot phenolic solvent, and in the second heat exchanger 6 hot phenolic solvent is used as the heat exchange medium.

The preheated hydrocarbon feed stream is led by line 9 into vapor-liquid separator or flash drum 10. A pressure reduction valve 11 may be placed in line 9 for controlling the reduction of pressure of the preheated stream which is to be flash distilled in drum 10. Hydrocarbon vapors, including unreacted hydrocarbons flash distilled from drum 10 are withdrawn overhead by line 12 to be charged into an intermediate feed point of the extractive distillation column 13. For effecting improvement of the present invention, phenolic solvent amounting to about 5–15 weight per cent of the hydrocarbon feed stream is injected from lines 14 and 15. Line 14 adds the makeup solvent, but after the process is started a portion of the solvent is added by the recycling line 15. The mixture of the hydrocarbons and the phenol, or oxy-organic solvent, is heated sufficiently in the heat exchanger zone 6 for subsequent vaporizing of most of the hydrocarbons except for those polymerized and thus reacted with the solvent. The temperature of the mixture thus heated is sufficient to cause polymerization of the unsaturated hydrocarbons and reaction of the unsaturated hydrocarbons with the solvent.

A substantial portion of the phenolic solvent will be vaporized with the hydrocarbons that are withdrawn from the flash drum 10 by line 12. The residual liquid solvent and high-boiling material containing sludge reaction products is withdrawn from the bottom of flash drum 10 by line 16. Most of this liquid residue may be recycled by pump 17 through recycle line 15 for injecting solvent back into the feed line 1.

To prevent build-up of high-boiling materials in the vaporization section, a portion of the liquid solvent containing high boiling materials is drawn off by line 18, the build up of high-boiling materials should not be allowed to go above 30 to 40% by weight of the liquid withdrawn from flash drum 10. The rejected amount of solvent which is removed with high-boiling material through line 18 is made up by addition of solvent through the make-up supply line 14, which also has to supply enough of the solvent to make up for that amount of solvent which is removed with hydrocarbon vapors overhead from flash drum 10.

Column 13 represents a conventional extractive distillation column receiving feed from the inlet 12. This column is provided with necessary fractionating plates. The phenolic solvent enters at an upper part of column 13 from line 20. The phenolic solvent being charged to the upper part of column 13 may be the preheated heat exchange liquid withdrawn from heat exchanger 6 by line 8, then moderated in temperature in cooler 21, hence the solvent is preferably at a temperature near the top vapor temperatures in column 13. Distilled vapors are withdrawn overhead from column 13 from line 22 through condenser 23, and condensate from condenser 23 is caught in a receiver 24. A portion of the condensate is returned as reflux through line 25. The remaining portion of condensed distillate is withdrawn as raffinate (olefinic) product by line 26.

Conditions are maintained in the extractive distillation column 13 to make the solvent flow as liquid down to the bottom part of the column where it becomes stripped of the olefinic hydrocarbons to be separated from the aromatic hydrocarbon which is extracted by the solvent. The extract solution of the aromatic hydrocarbon in the liquid solvent is withdrawn as bottoms by line 27 through pump 28. A portion of this bottoms liquid is recycled through reboiler 29 and line 30 to column 13. The remaining portion of the bottoms liquid is withdrawn by line 31 to be sent to the usual extract stripping column, which is not shown. The liquid solvent sent to inlet 7 of heat exchanger 6 may be the material which is obtained from the stripping column wherein the solvent is stripped of the extracted aromatic hydrocarbon.

As an example of the operation about 10,000 pounds of crude benzene are pumped at a pressure of about 10 to 15 p. s. i. g. through line 1 through the vaporizing heat exchanger with about 1,000 pounds of added phenolic solvent liquid. This mixed stream of hydrocarbons, which includes benzene with $C_5$ to $C_7$ alkenes and dienes, and phenol which amounts to about 10% by weight of the hydrocarbon is heated to a temperature between 185° F. and 200° F. and is flashed into a vapor-liquid separating flash drum.

Nearly all the benzene and hydrocarbons close-boiling thereto are vaporized in the flash drum with nearly half the amount of phenol which is admixed with the hydrocarbons. The vaporized phenol-hydrocarbon mixture is passed from the flash drum at about 190° F. into the extractive distillation column 13, which is operated at a pressure of about 0 to 5 p. s. i. g. If the column is supplied with about 10,000 pounds per hour of hydrocarbon feed material it is supplied through the upper solvent inlet 20 with solvent at the rate of about 40,000 to 50,000 pounds per hour. The non-aromatic hydrocarbons are at a vapor temperature of about 165° to 185° F. as they are withdrawn overhead from the extractive distillation column. With the feed stream containing about 50 to 65% unsaturated hydrocarbons, the sludge formation rate was determined to be about 36 pounds per hour in the extractive distillation column at a feed rate of about 10,000 pounds per hour of the crude benzene. Use of the phenol in the vaporization section drastically reduces the amount of sludge formed in the extractive distillation column and brings about a better extractive distillation in the column. Other benefits obtained in the extractive distillation in reducing the amount of sludge formation therein are:

(1) Reduction in amount of inert material circulated with solvent in the extractive distillation and stripping operations.

(2) Lowering of utility consumption for heating and cooling inert materials, and (3) Increased capacity in the extractive section.

In particular, the disruptive formation of solid deposits on the feed plate is eliminated, especially in using a vaporized hydrocarbon feed.

The relatively small proportion of phenolic solvent admixed with the hydrocarbon feed in the vaporization section acts as a liquid flux for such polymer material as is formed and which would otherwise form an adherent deposit on the heating tubes. The heating tubes are kept wet with liquid even if nearly all of the feed is vaporized in the heating tube.

It is advantageous to have a substantial proportion of the total polymer formed from the reactive hydrocarbons outside the extractive distillation column as has been pointed out, since it is more difficult to remove the solid material from the extractive distillation column.

This invention can be used to advantage with any oxy-organic solvent similar to phenol in physical and chemical characteristics, e. g. cresols, polyglycols, and high-boiling carbonyl compounds, insofar as such compounds have similar sludge-forming tendencies during the extractive distillation.

The invention described is claimed as follows:

1. In an extraction distillation process for purifying a $C_6$ to $C_8$ aromatic hydrocarbon feed wherein the aromatic is mixed with $C_5$ to $C_8$ unsaturated hydrocarbons which polymerize and react with phenol solvent used in the extractive distillation, the improvement in pretreating the feed to said distillation process which comprises mixing said aromatic hydrocarbon feed with a minor proportion of said solvent, maintaining the mixture at a temperature sufficient to cause reaction of the said unsaturated hydrocarbons with said solvent, evaporating the heated mixture in a feed vaporizing zone at a pressure sufficient to maintain a portion of said solvent in liquid phase, passing the resulting vapors to an extractive distillation zone, and withdrawing a liquid stream of sludge-containing solvent from said vaporizing zone.

2. In separating and purifying benzene from a feed containing a major amount of $C_5$ to $C_7$ alkenes and dienes including components which polymerize and react with phenol to form a sludge under extractive distillation conditions, the improvement which comprises mixing said feed with a minor amount of liquid phenol, passing a stream of the resulting mixture through a heating zone to heat the hydrocarbons to a temperature of at least 185° F., passing the heated mixture of feed and phenol into a flash vaporization zone in which unreacted hydrocarbons and a portion of the phenol are separated as vapors from residual liquid phenol mixed with sludge reaction products, and returning a portion of said residual liquid phenol with sludge to the heating zone for admixture with the stream of hydrocarbons passed therethrough.

3. In the process defined by claim 2, the specific improvement of heating the hydrocarbons mixed with about 5 to 15 wt. per cent phenol in the heating zone to a temperature in the range of 185° to 200° F. under pressure and maintaining over 50 wt. per cent of phenol in the residual liquid from which vapors of the unreacted hydrocarbons are separated.

4. In the process of distilling $C_5$ to $C_8$ unsaturated hydrocarbons including reactive components which polymerize and react with a phenolic solvent on being heated to their boiling temperatures, the improvement which comprises admixing a minor proportion of the phenolic solvent with said hydrocarbon in liquid phase, passing the resulting mixture through a heating zone in which the mixture is heated sufficiently for subsequent vaporizing of most of the hydrocarbons except for those polymerized and reacted with the solvent, maintaining at least a portion of the admixed phenolic solvent in liquid phase as it is passed with said mixture through the heating zone, passing the heated mixture of the hydrocarbons to be vaporized with the liquid solvent and reaction products from the heating zone into a vapor-from-liquid separation zone, and separating vapors of the unreacted hydrocarbons from a remaining liquid containing part of said phenolic solvent and the reaction products.

5. In prevaporizing an aromatic-olefinic hydrocarbon fraction to be extractively distilled with a larger quantity of phenol as solvent, the steps which comprise vaporizing said fraction in the presence of added phenol which is about 1 to 5 wt. per cent of the phenol used in the extractive distillation, separating the aromatic and olefin hydrocarbons vaporized with some of the phenol from a liquid residue containing a phenol and sludge reaction products, and passing the vaporized hydrocarbons and phenol into an extractive distillation zone for contact with the larger quantity of phenol required for extractive distillation.

References Cited in the file of this patent

UNITED STATES PATENTS

| Number | Name | Date |
| --- | --- | --- |
| 2,186,617 | Othmer | Jan. 9, 1940 |
| 2,350,609 | Hackmuth | June 6, 1944 |
| 2,369,022 | Cooper et al. | Feb. 6, 1945 |
| 2,375,035 | Pierotti | May 1, 1945 |
| 2,593,931 | Stearns | Apr. 22, 1952 |